United States Patent

[11] 3,619,775

[72] Inventors Robert J. Naylor
Cape May Point;
Leroy H. Werner, Burlington, both of N.J.
[21] Appl. No. 879,865
[22] Filed Nov. 25, 1969
[45] Patented Nov. 9, 1971
[73] Assignee Pulse Monitors, Inc.
Moorestown, N.J.

[54] POLARITY AND VOLTAGE LEVEL DETECTING TEST PROBE
13 Claims, 9 Drawing Figs.
[52] U.S. Cl. .................................................. 324/73,
324/133, 340/248
[51] Int. Cl. ........................................................ G01n 15/12
[50] Field of Search.......................................... 234/73,
122, 133; 340/248

[56] References Cited
UNITED STATES PATENTS
2,965,889  12/1969  Cook, Jr. et al. ............... 324/133 X
3,076,901  2/1963  Rubin et al. .................... 324/133 X
3,525,939  8/1970  Cartmell......................... 324/133

Primary Examiner—Edward E. Kubasiewicz
Attorney—Edelson & Udell

ABSTRACT: An electrical test instrument for use in servicing digital computers which provides a digital output by means of two lamps indicating the characteristics of a voltage level or pulse or train of pulses at a point in the computer. The instrument comprises a test probe connected through a selectively inserted zener diode to a pair of cascaded amplifiers each of which drives a gating circuit and a control circuit for providing a conditioning signal to the gates. The gate circuits in turn control the indicating lamps. A pair of flip-flops may be selectively placed in the circuit between the amplifiers and the gates when the test instrument is used to indicate statically the condition of the first pulse received by the probe.

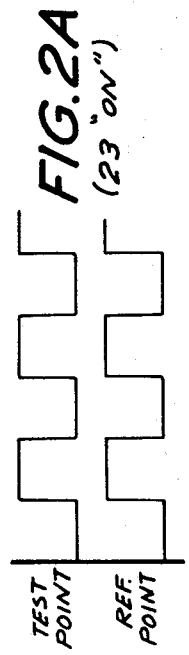
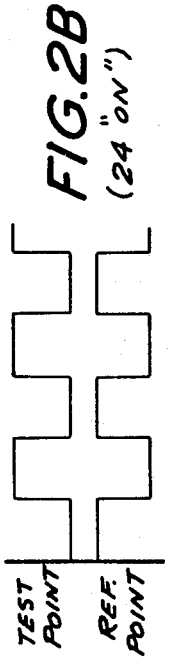
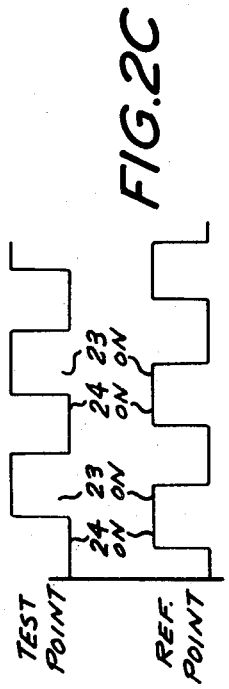
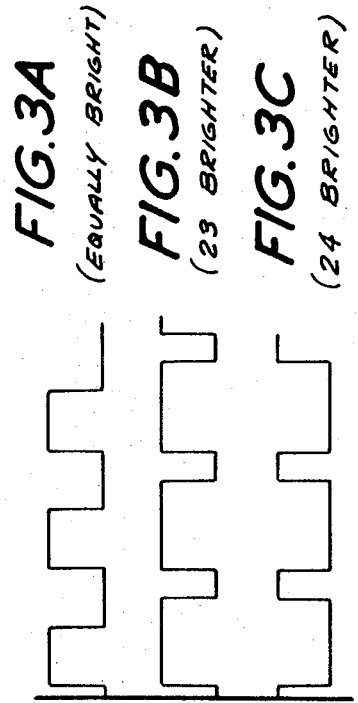
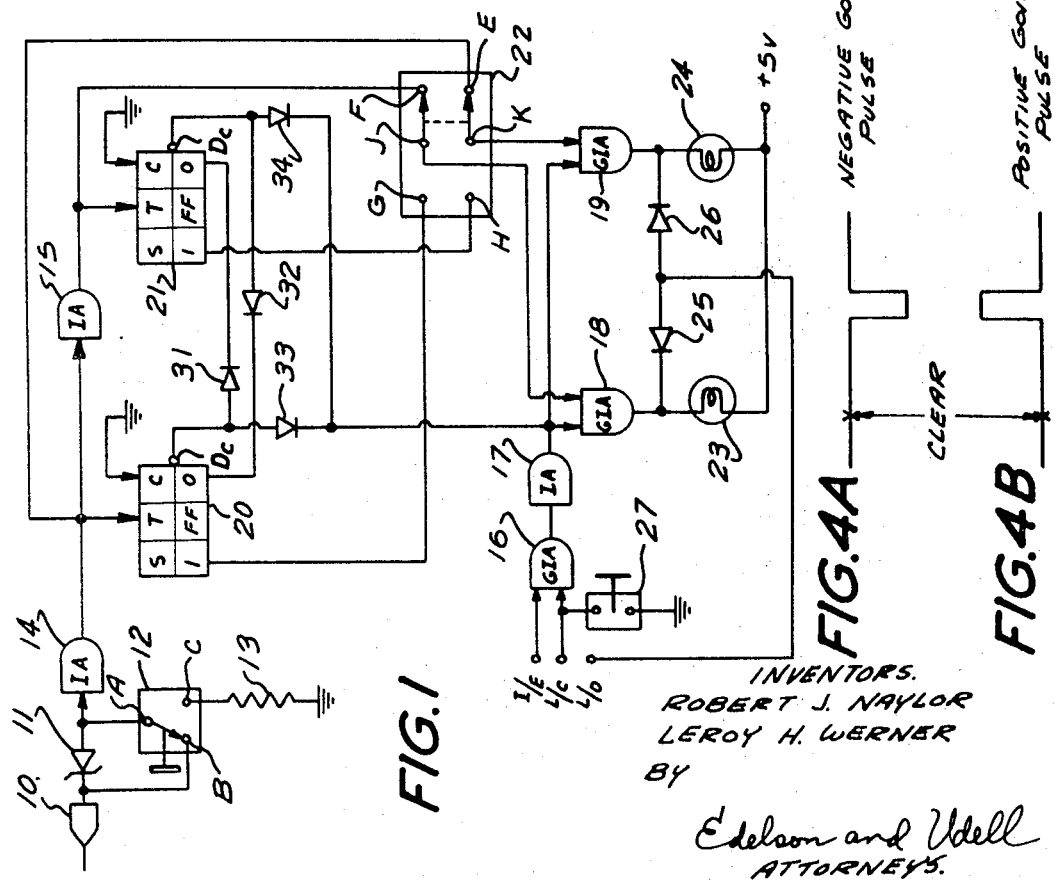
INVENTORS.
ROBERT J. NAYLOR
LEROY H. WERNER
BY
Edelson and Udell
ATTORNEYS.

POLARITY AND VOLTAGE LEVEL DETECTING TEST PROBE

This invention relates to a small hand held electrical test instrument which has particular utility in testing electronic digital computing equipment.

In one mode of operation (PULSE) the instrument provides an output indicative of the occurrence of and polarity of a pulse at a test point, and in another mode (LEVEL) provides an output indicative of, at a test point, a. a low level potential;
b. a high level potential;
c. a floating potential;
d. the phase of a pulse train with respect to a pulse train at a reference point (inphased, outphased, or mixed phased); and
e. a pulse train duty cycle. Additionally, output gating can be performed to start or stop auxiliary equipment such as counters or generators.

A modern electronic digital computer is usually very complex both from the point of view of the arrangement of the circuit switch form the logical configuration of the computing equipment and the circuits themselves. In the past, to perform the procedures required for production line testing and field maintenance of digital computers has required costly and complicated electronic test apparatus to be used in time-consuming efforts by highly skilled electrical engineers.

In contrast to the prior art testing apparatus the instrument disclosed herein is neither costly nor complicated. Further, not only can it be used by skilled engineers, but it can likewise be used by junior grade engineers and technicians. Despite its low cost, simplified construction and ease of use, the test equipment disclosed herein may be used to perform significant tests in determining whether a digital computer is operating correctly.

In digital equipment, information is transmitted by means of pulse trains and many of the electric elements therein produce a stable output which is either at one or the other of two voltage levels, i.e., a voltage of a relatively high or low level. In a first or LEVEL mode of operation the instant test equipment indicated by means of a binary output (the conditions of two lamp indicators), whether a circuit point under test is producing a high or low level output or whether the test point is floating, that is, unconnected to a source of potential.

Information to be operated upon by digital equipment is transmitted within such equipment in the form of a series or train of electrical pulses which alternate from a low to a high level. Often it is useful to know if a pulse train taken from one test point in a computer is inphase or inverted from a similar pulse train emanating from a different test point therein. The instant apparatus not only indicates whether the two such pulse trains are inphase but also indicates their relative phase relationship.

Also in the same mode of operation the duty cycle of a train of pulses may be indicated, i.e., an indication of the ratio of high level to level voltages of a pulse train can be shown.

Further, in testing a computer it is desirable to know if a single pulse occurs at an expected time and with the expected polarity. In a second or pulse mode of operation, an indication of whether such a pulse occurred and its polarity is given, as well as producing a synchronizing pulse which may operate remote equipment. Additionally in the same mode of operation the presence of a first high pulse in a train of pulses may be detected.

The general object of this invention is to provide a low cost easily operated test instrument which may be used in diagnosing computer faults and in production line testing.

Another object of this invention is to provide a low cost easily operated test instrument for use in indicating in digital form the voltage levels at various points in an electronic digital computer.

Yet another object of this invention is to provide a low cost easily operated test instrument for use in indicating the duty cycle of a train of electrical pulses.

A further object of this invention is to provide a low cost easily operated test instrument for use in comparing the phase relationship of two similar trains of electrical pulses and for use in indicating in digital form the polarity of the first pulse in a train of electrical pulses.

The aforementioned objects and features of the present invention will be better understood from the following description read in conjunction with the drawings presented herein, wherein:

FIG. 1 is a logical block diagram illustrating the test instrument; and

FIGS. 2A, 2B and 2C, 3A, 3B, 3C, 4A, and 4B illustrate typical electrical waveforms with which the test instrument may be used.

CIRCUIT DESCRIPTION

Referring now to FIG. 1 there is shown a logical block diagram of the instant test instrument in which a probe 10 is connected to the cathode of a zener diode 11, which in the preferred form of this invention is a type IN5231B zener diode and is commercially available. The anode of diode 11 is connected to the input of inverting amplifier 14 (IA) and to the pole A of single pole switch 12 which has two additional terminals B and C shown connected respectively to the cathode of diode 11 and to one end of resistor 13. The remaining end of resistor 13, which in the preferred form of the invention has a value of 75,000 ohms, is connected to ground reference. In the normal position of switch 12, diode 11 is shorted out and the probe 10 is coupled to the input of amplifier 14. While FIG. 1 shows a direct connection of diode 11 to the input of amplifier 14 in practice it has been found desirable to couple the anode of diode 11 to the input of amplifier 14 through an isolating transistor (not shown) connected as an emitter follower.

The output of amplifier 14 is connected to the input of inverting amplifier 15 and to terminal E of switch 22 which is a double pole double throw switch having additional terminal F, G and H and poles J an K. The output of amplifier 15 is connected to terminal F of switch 22. The poles J and K of switch 22 in the illustrated LEVEL position respectively connect the output of amplifier 15 to one input of lamp driver gated inverter amplifier 18 (GIA) and the output of amplifier 14 to one input of lamp driver gated inverter amplifier 19. The remaining input to each of gates 18 and 19 are derived from the output of inverting amplifier 17 which in turn receives the output of a two-input NAND gate and inverter amplifier 16 (GIA). One input to NAND gate 16 is connected to terminal I/E and the other input is connected to terminal L/C or to ground through the clear switch 27 which normally open as shown.

The output of lamp driver gates 18 and 19 are connected through red and green lamps 23 and 24 respectively to a source of high-level voltage which in the illustrated embodiment of the invention is $\pm 5$ volts, the outputs of gates 18 and 19 being also connected to the cathodes of diodes 25 and 26 which latter are connected at their anodes to the output terminal L/O. Diodes 25 and 26 act as a logical buffer to transmit a low-level voltage from either amplifier 18 or 19 to the output terminal L/O.

Amplifiers 14, 15, 17 and NAND gate 16 are all commercially available and each comprise one section of a type 8,880 QUAD two-input NAND gated amplifier. The 8,880 QUAD 2 input NAND gate has four identical sections each having two inputs and an output and is manufactured by the Signetics Corporation. Only one input is used in each of the sections employed for inverting amplifier 14, 15 and 17 which operate to produce a high-level output in response to a low-level input, and a low-level output with either no input or a high-level input. Both inputs are used in the section forming NAND gate and amplifier 16. A low level at either input to gate 16 causes a high-level output to be produced, a high-level voltage or the absence of a low-level voltage at either input causes a low-level output to be produced.

Inverter gates 18 and 19 are also identical in construction and are likewise commercially available from the Signetics Corporation. These gates are each made from the section of the type 8,885 dual gate and operate to produce a low-level output voltage in response to a coincidence of high -level input voltages. If any input to either gate 18 or 19 is at a low level that gate will produce a high-level output of approximately +5 volts.

Two flip-flops (FF) 20 and 21 each having output terminals 1 and 0 are used in the test instrument when the switch 22 is in the PULSE position. Each flip-flop is capable of assuming two stable states, one or zero. These flip-flops are also commercially available and are type 8,822 sold by the Signetics corporation. When flip-flop 20 or 21 is in the "one" state the "1 " output terminal thereof is at a high level and the "0" output terminal is at a low level, and when flip-flop 20 is in the "zero" state the reverse condition obtains. The "1" output terminals of flip-flops 20 and 21 are connected through terminals G and H of switch 22, when the switch is in the PULSE position, to one input of gates 18 and 19 respectively.

The 8,822 type flip-flops used in making the preferred embodiment of the invention have four input terminals S, T, C and $D_C$. A negative pulse applied to terminal S or C causes the flip-flop to be in the one or zero state respectively. A negative pulse to the T input will toggle the flip-flop causing it to change state, and a negative level applied to the $D_C$ input causes the flip-flop to be held in the zero state as long as the negative level subsists.

The C inputs of the flip-flops 20 and 21 are both grounded so that any negative pulse applied to the T inputs thereof will only toggle the flip-flops from the zero to one state, if these flip-flops are not otherwise held in their zero states. The T inputs of flip-flops 20 and 21 are connected to the outputs of amplifier 14 and 15, respectively.

The $D_C$ input of flip-flop 20 is coupled to the anodes of diodes 31 and 33 the cathodes of which are respectively connected to the zero output of flip-flop 21 and the output of amplifier 17. Similarly, the $D_C$ input of flip-flop 21 is coupled via diode 32 and 34 to the "0" output of flip-flop 20 and the output of amplifier 17.

In operation, a negative signal applied to the input of amplifier 16 will produce a positive output therefrom which is applied to amplifier 17. This amplifier will in turn produce a negative signal which is applied via diodes 33 and 34 to the $D_0$ inputs of flip-flops 20 and 21 to cause both of these flip-flops to be held in the "zero" state. A pulse applied to the input of amplifier 14 will trigger either flip-flop 20 or 21 to the "one" state assuming both flip-flops have previously been cleared to the "zero" state by the application of a low-level signal to amplifier 16 as explained above. When flip-flop 20 is in the "one" state, a low-level signal from its "0" output terminal is coupled via diode 32 to the $D_0$ input of flip-flop 21, and when flip-flop 21 is in the "one" state a low-level signal from its "0" output terminal is coupled via diode 31 to the $D_C$ input of flip-flop 20. Consequently, if either flip-flop 20 or 21 is in the "one" state it will prevent the other flip-flop from being triggered from the "zero" to a "one" state.

A positive or high-level pulse applied to amplifier 14 causes a negative or low-level pulse to be produced at its output which is applied to the T input of flip-flop 20. This negative pulse sets flip-flop 20 to the "one" state if a low-level voltage is not present at the $D_C$ input of that flip-flop. The negative or low-level output of amplifier 14 will also cause amplifier 15 to produce a positive or high-level signal which is applied to the T input of flip-flop 21 without effect. When flip-flop 20 is set to the "one" state a low level signal from the "0" output terminal, jams flip-flop 21 t the zero state. On the other hand, if a negative or low-level pulse is applied to amplifier 14 a high-level pulse is produced at its output which is applied to the T input of flip-flop 20 where it will have no effect. This high-level pulse is also applied to amplifier 15 which in turn produces a low-level pulse applied to the T terminal of flip-flop 21 causing this flip-flop to be triggered to the "one" state. The "0"output of flip-flop 21 will then be applied to the $D_0$ input of flip-flop 20 holding this flip-flop in the "zero" state.

In describing the apparatus shown in FIG. 1 mention has been made of certain commercially available elements, but it should be understood that the test instrument described herein may be constructed with other flip-flops, amplifiers and gates known in the art.

PULSE-LEVEL SWITCH IN LEVEL POSITION

As previously mentioned, the use of the test instrument is for confirming an expected high or low-level voltage at a specific test pint within a computer, or for indicating that the test point is open or unconnected. In this mode of operation the switch 22 is set at the LEVEL position illustrated in FIG. 1 so that the output of amplifier 14 and 15 are connected to the inputs of gates 18 and 19 respectively. During the first part of the test, switch 12 is in its normal position so that zener diode 11 insert circuited and switch 27 is open, as shown.

Before the probe 10 is placed on the point in a computer to be tested, high-indicator lamp 23 will be on and low-indicator lamp 24 will be off. This occurs because amplifier 14 produces a low-level output in the absence of any input signals. The low-level output is applied to one input of lamp driver gate 19 through switch 22 (terminal E) and prevents this gate from producing the low-level output voltage necessary to turn indicator lamp 24 on. The same low-level output from amplifier 14 causes amplifier 15 to produce a high-level signal which is applied through switch 22 (terminal F) to one input of lamp driver gate 18. The other input to gate 18 comes from the output of amplifier 17 which is also high at this time. This is true because gated amplifier 16, which drives amplifier 17 is not receiving any input at this time and therefore produces a low-level output. With both inputs to inverter gate 18 at a high level the output from this inverter gate will be at a low level or approximately ground potential and lamp 23 will be turned on.

1. Low-Level Potential Detection

When now test probe 10 is placed on the point to be tested, if the test point is at a low level, this potential will be applied through terminal B and pole A of switch 12 to the input of amplifier 14 which produces a high-level output at the input of amplifier 15. Amplifier 15 in turn produces a low-level output which is applied via switch 22 to the input of gate 18. In response to this low-level input, inverter gate 18 produces a high-level output (approximately 5 volts) and lamp 23 is extinguished. The high-level output from amplifier 14 is also applied via switch 22 (terminal E) to one input of gate 19. Inverter gate 19 also receives a high-level signal from gate 17 and in response to these two high-level input signals produces a low-level output signal (approximately ground potential) which is applied to lamp 24. Lamp 24 is turned-on and indicates a low-level potential at the test point.

2. High-Level Potential/Floating Point Detection

If on the other hand the probe 10 is placed on a point at a high level, this potential is applied as before through switch 12 to the input of amplifier 14 which produces a low-level output signal. The low-level output from amplifier 14 will as previously explained turn (or in this case keep) lamp 23 on. When this condition occurs a determination must be made as to whether the point under test is floating, or is actually at a high-level potential. This determination is made by keeping the probe 10 at the same point in the computer circuit and operating switch 12 to transfer pole A from terminal B to terminal C so that (1) the short circuit across zener diode 11 is removed, putting diode 11 in series with probe 10 and the input of amplifier 14; and (2) the input of amplifier 14 is connected to ground potential through resistor 13. If the point under test is truly at a high level (e.g., 5 volts) zener diode 11 conducts and the high-level voltage developed across resistor 13 is applied to amplifier 14 which then produces a low-level output in response thereto. This low-level output, as before, keeps lamp 23 on. However, if the point under test is not connected, (i.e., less than 3.5 volts) then zener diode 11 does not conduct and the input of amplifier 14 is connected to ground potential through switch 12 and resistor 13. Consequently, at this time the input to amplifier 14 appears low and this amplifier produces a high-level output signal which turns lamp 23 off and turns lamp 24 on, as previously explained. Thus, the instrument shown in FIG. 1, indicates, in a two part operation, whether a test point is at a low level, a high level, or is open.

3. Pulse Train Phase Relations

In addition to its use as a level indicator, the test instrument may be used to show if a pulse train at a reference point is inphase or inverted from a similar pulse train at a test point. When used in this manner the switch 22 is placed in the LEVEL position and switch 12 is left in the normal position. A lead is connected between terminal I/E and the reference point in the computer and the probe 10 is connected to the test point.

a. Inphase Pulse Trains

If the two pulse trains are inphase as shown in FIG. 2A the lamp 23 will be one. This occurs in the following manner. Every high-level pulse in the train at the test point causes amplifier 14 to produce a low-level output which as previously explained causes a high-level voltage to be applied to one input of gate 18 and a low-level voltage to be applied to one input of gate 19. The coincident high-level pulse at the reference point causes amplifier 16 to produce a low-level pulse at its output which in turn causes amplifier 17 to produce a high-level output pulse. This high-level output pulse is applied to both gates 18 and 19, but only gate 19 has two high-level input signals and it produces in response thereto a low-level output causing lamp 23 to turn on.

Every low-level pulse in the train at the test point causes amplifier 14 to produce a high-level output which is previously explained causes a low-level voltage to be applied to one input of gate 18 and a high-level voltage to be applied to the input of gate 19. The coincident low-level pulse at the reference point causes amplifier 16 to produce a high-level pulse and amplifier 17 to produce a low-level pulse which is applied to both gates 18 and 19. Since gates 18 and 19 do not receive coincident high-level input pulses, neither produces a low-level output and lamps 23 and 24 will be off. Even though lamp 23 is not energized each time the pulse at the reference point is at a low potential, due to the pulse train repetition rate and the thermal mass of the lamps, to the observer it will appear that the lamp 23 produces a steady light since the lamp 23 is turned on each time the pulses in the wave train are at a high level.

b. Outphased Pulse Trains

If the two waveforms are out of phase as shown in FIG. 2B, the lamp 24 will be turned on and lamp 23 turned off. In this case every high pulse in the train at the test point causes a high-level voltage to be applied to gate 18 and a low-level voltage to be applied to gate 19 as previously explained. At the same time the low-level, out-of-phase pulses from the reference point causes amplifier 16 to produce a high-level output which in turn causes amplifier 17 to produce a low-level output at the inputs of both gates 18 and 19. Accordingly both gates 18 and 19 then produce high-level outputs and lamps 23 and 24 cannot be turned-on while the reference point pulses are at their low level.

Every low-level pulse in the train at the test point causes a high-level voltage to be applied to one input of gate 19 and low-level voltage to be applied to one input of gate 18. At the same time the high-level out-of-phase pulse from the reference point causes amplifier 16 to produce a low-level output which in turn causes amplifier 17 to produce a high-level output which is applied to the inputs of both gates 18 and 19. Only gate 19 will then have high-level signals applied to both of its inputs and it will produce a low-level output signal turning lamp 24 on. Lamp 24 is turned on continuously each time the voltage at the reference point is high and the voltage at the test point is low. Thus, as previously explained, to the observer it will appear that lamp 24 produces a steady light.

c. Mixed Phase Pulse Trains

If the two waveforms are not completely inphase or not completely out of phase as shown in FIG. 2C, both lamps 23 and 24 will be turned-on. The lamps 23 and 24 will be energized only when the reference voltage is at a high level. Lamp 24 will be on for the length of time that the reference voltage is at a high level and the voltage at the test point is at a low level and lamp 23 will be on for the time the voltages at both points are at a high level. Consequently the more nearly the two waveforms are inphase the brighter lamp 23 will be with respect to lamp 24 and the more nearly the two waveforms are out of phase the brighter lamp 24 will be with respect to lamp 23.

4. Pulse Train Duty Cycle

The test equipment shown in FIG. 1 may also be used for indicating the duty cycle of pulses in a train. In this operation the switches 12 and 22 are left in the position shown in FIG. 1 and the probe 10 is placed on the test point. As previously explained when the probe 10 is placed on a test point which is at a high-level, lamp 23 turned-on (lamp 24 is off) and when the test point is at a low-level lamp 24 is turned-on (lamp 23 is off). Lamps 23 and 24 remain in their respective conditions as long as the voltages at the test point remain unchanged. Thus, if the train of pulses at the test point has a 50—50 duty cycle as shown in FIG. 3A both lamps 23 and 24 will be on with equal brightness. In particular, the low-level portion of the pulse train (shown in FIG. 3A) turns lamp 24 on and the high-level portion thereof turns lamp 23 on. If the train of pulses at the test point is at a high level more than it is at a low level (FIG. B) both lamps 23 and 24 will still be turned-on but test lamp 23 will be brighter than lamp 24, and if the reverse condition obtains (FIG. 3C) lamp 24 will be brighter than lamp 23. With the illustrated components a five to one (5:1) ratio will cause one of the lamps to be almost extinguished.

PULSE-LEVEL SWITCH IN PULSE POSITION

In some other test situations, it is desirable to know if a single pulse occurs at an expected time and with the expected polarity. In this test, switch 22 is placed in the PULSE position so that the "1"outputs of flip-flops 20 and 21 are connected to the inputs of gates 18 and 19 respectively. The probe 10 is placed on the test point and switch 27 is depressed causing a low-level (ground) potential to be applied to gate 16 and to the output terminal L/C to which an external device may be connected. Gate 16 produces a high-level output and amplifier 17 in response to this output produces a low-level output voltage which is applied the inputs of both gates 18 and 19. Both these gates then produce high-level output voltages and consequently both lamps 23 and 24 will be off. The low-level output from gate 17 is also applied to the $D_c$ inputs of flip-flops 20 and 21 jamming both of these flip-flops to the "zero" output state, notwithstanding any other applied inputs to these flip-flops.

When it is desired to observe the condition of the test point, switch 27 is released and gate 16 will again produce a low-level output which causes amplifier 17 to feed a high-level output voltage to alert gates 18 and 19. In addition, the low-level voltage previously applied to the $D_c$ inputs of flip-flops 20 and 21 is removed as is the low voltage at the L/C terminal. The removal of the low at the L/C terminal may be used to start/stop synchronize auxiliary equipment connected thereto with the beginning of the search for a pulse. The first pulse which appears at the test point after switch 27 is released will be picked up by the probe 10 and fed to the input of amplifier 14. When switch 22 is in the PULSE position the input jack I/E may also be used in lieu of switch 27 to accept a remote low-level voltage to inhibit pulse detection. When this external low-level voltage changes to a high, it enables the flip-flops 20 and 21 to toggle in response to a pulse picked up by the probe 10.

1. Negative Pulse Detection

If the first pulse is negative (FIG. 4A) amplifier 14 produces a high-level output pulse which is applied to the T input of flip-flop 20 where it will have no effect, and to the input of amplifier 15. Amplifier 15 then produces a low-level output which is applied to the T input of flip-flop 21 setting this flip-flop to the "one" state. In the "one" state, flip-flop 21 produces a high and low output at its "1" and "0" output terminals respectively. The low-level voltage at the "0" terminal of flip-flop 21 is coupled via diode 31 to the $D_C$ input of flip-flop 20 to hold this flip-flop jammed in the "zero" state. The high-level voltage from the "1" output terminal of flip-flop 21 is transmitted via terminal H and pole K of switch 22 to one input of gate 19. The other input to gate 19 is at a high level at this time and accordingly gate 19 produces a low-level voltage output turning lamp 24 on. This low-level voltage is also transmitted to output terminal L/O in synchronism with the receipt by probe 10 of the first negative pulse, and may thereby control auxiliary equipment connected to terminal L/O.

2. Positive Pulse Detection

If, on the other hand, the first pulse is positive (FIG. 4B), after the switch 27 is released, amplifier 14 produces a low-level output which triggers flip-flop 20 to the "one" state. In the manner previously described a low-level output from the "0" terminal of flip-flop 20 causes flip-flop 21 to be jammed to the "zero" state. The high-level output from the "1" output terminal of flip-flop 20 is transmitted via terminal G and pole J of switch 22 to gate 18 which produces a low-level output in response thereto, turning lamp 23 on. The low-level output from gate 18 is transmitted via diode 25 to the output terminal L/O in synchronism with the receipt of the first positive pulse received by the probe 10. In either case mentioned above because of the flip-flop jammed conditions, the second pulse received by probe 10 will not change the condition of the output lamps 23 and 24 when switch 22 is in PULSE position.

What is claimed is:

1. An electronic test instrument comprising first and second amplifiers each having an output and an input and producing a high-level output voltage in response to a low-level input voltage and a low-level output voltage in response to a high-level input voltage wherein the output of said first amplifier is connected to the input of said second amplifier, probe means for receiving a first train of negative and positive going substantially rectangular pulses coupled to the input of said first amplifier, wherein a first portion of said train of pulses is at a high-voltage level and a second portion of said train of pulses is at a low-voltage level, first and second gating means each having first and second inputs and an output and producing an output when both inputs thereto are at a predetermined voltage level, means connecting the output of said first amplifier to the first input of said first gating means and for connecting the output of said second amplifier to the first input of said second gating means, control means coupled to the second inputs of said gating means for applying said predetermined voltage levels thereto, first and second indication means connected respectively to the outputs of said first and second gating means for producing an indication when that gating means connected thereto produces an output whereby said first indication means produces an indication when said probe receives said first portion of said train and said second indication means produces an indication when said probe receives said second portion of the train.

2. The test instrument defined in claim 1 further including an input terminal connected to said control means for receiving a second train of negative and positive going substantially rectangular voltage pulses wherein a first portion of said train of pulses is at a high-voltage level and a second portion of said train is at a low-voltage level and said control means includes apparatus for producing said predetermined voltage levels in response to one portion of said second train of pulses at said second inputs of said gating means, whereby said first indication means produces an indication when the first portion of said first and second trains are received by said probe and said input terminal respectively, and said second indication means produces an indication when the second portion of said first train and the first portion of said second train are received by said probe and said input terminal, respectively.

3. The test instrument defined in claim 1 wherein said control means comprises a third gating means having two inputs and an output and producing a low-level output when no input signals are applied and a high-level output signal when any input thereto receives a low-level signal, and a third amplifier having an input and an output wherein the output of said third amplifier is connected to the second inputs of said first and second gating means for rendering said first and second gating means operative when said third gating means does not receive any input signals.

4. The test instrument defined in claim 3 including selectively operable means for applying a low-level signal to the input of said third gating means.

5. An electronic test instrument comprising first and second amplifiers each having an output and an input and producing a high-level output voltage in response to a low-level input voltage and a low-level output voltage in response to a high-level input voltage wherein the output of said first amplifier is connected to the input of said second amplifier, first and second gating means, each gating means having first and second inputs and an output and producing an output when both inputs thereto are at a predetermined voltage level, means connecting the output of said first amplifier to the first input of said first gating means and for connecting the output of said second amplifier to the first input of said second gating means, control means coupled to the second inputs of said gating means for applying said predetermined voltage level thereto, first and second indication means connected respectively to the outputs of said first and second gating means for producing an indication when the gating means connected thereto produces an output, probe means for receiving voltages from a test point, a low-level voltage source, an impedance means having two terminals, and being connected to said low-level voltage source at one of said terminals, threshold means producing a high-level output in response to an input of substantially said predetermined voltage level connected between said probe means and the input of said first amplifier and a selectively operable switching means having a first position for shorting out said threshold means and a second position for coupling the other terminal of said impedance means to the output of said threshold means and the input of said first amplifier.

6. The test instrument defined in claim 5 wherein said threshold means is a zener diode.

7. The test instrument defined in claim 5 wherein said first and second amplifiers produce high-level output signals in the absence of an input signal.

8. An electric test instrument comprising first and second amplifiers each having an output and an input and producing a high-level output voltage pulse in response to a low-level input voltage pulse and a low-level output voltage pulse in response to a high-level input voltage pulse wherein the output of said first amplifier is connected to the input of said second amplifier, probe means for receiving a positive or negative going voltage pulse coupled to the input of said first amplifier, first and second flip-flops, each having first and second stable states and first and second outputs, each flip-flop producing a predetermined voltage level at its respective first output in said first stable state, each of said flip-flops having an input terminal for receiving input pulses, said flip-flop being set to said first state by an input pulse of one polarity at said input terminal, each of said flip-flops having a clear terminal for receiving an input signal forcing said flip-flop to be set to the second stable state as long as said clear terminal receives an input signal, the clear terminal of said first flip-flop being coupled to an output of said second flip-flop for receiving said input signal therefrom when said second flip-flop is set to said first stable state, the clear terminal of said second flip-flop being coupled to an output of said first flip-flop for receiving said input signal therefrom when said first flip-flop is set to said first stable state, first and second gating means, each gating means having first and second inputs an output and producing an output signal when both inputs thereto are at said predetermined voltage level, means connecting the first output of said first flip-flop to the first input of said first gating means and for connecting the first output of said second flip-flop to the first input of said second gating means, and selectively operable control means coupled to the second inputs of said gating means for applying said predetermined voltage levels thereto or for applying an input signal to the clear terminals of said first and second flip-flops to force said flip-flops to remain in said second state.

9. The test instrument defined in claim 8 further including means connected respectively to the outputs of said first and second gating means for producing an indication when either gating means connected thereto produces an output signal.

10. The test instrument defined in claim 8 further including an output signal terminal coupled to said control means, which output signal terminal receives a first output signal whenever said control means is operated to apply said predetermined voltage level to said gating means and receives a second output signal different from said first output signal whenever said control means is operated to apply a signal to the clear terminals of said flip-flops.

11. The test instrument defined in claim 8 further including an output signal terminal coupled to the outputs of both of said gating means, which output terminal receives an output signal whenever an aforesaid output signal is produced by either of said gating means.

12. The test instrument defined in claim 8 further including a first output signal terminal coupled to said control means and a second output signal terminal coupled to the outputs of both of said gating means, said first output signal terminal receiving a first output signal whenever said control means is operated to apply said predetermined voltage level to said gating means, and said second output signal terminal receiving an output signal whenever an output signal is produced by either of said gating means.

13. The test instrument defined in claim 1 further including a first output signal terminal coupled to said control means and a second output signal terminal coupled to the outputs of both of said gating means, said first output signal terminal receiving a first output signal whenever said control means is operated to apply said predetermined voltage level to said gating means, and said second output signal terminal receiving an output signal whenever an output signal is produced by either of said gating means.

* * * * *